(12) United States Patent
Raizen et al.

(10) Patent No.: US 8,819,307 B1
(45) Date of Patent: Aug. 26, 2014

(54) IDENTIFICATION AND USE OF PREFERRED PATH GROUPS IN HOST COMPUTER BASED ON DIFFERENTIAL PERFORMANCE

(75) Inventors: Helen S. Raizen, Jamaica Plain, MA (US); Michael E. Bappe, Loveland, CO (US); Vinay G. Rao, Karnataka (IN); Subburaj Ramasamy, Karnataka (IN); Jimmy K. Seto, Wakefield, MA (US)

(73) Assignee: EMC Corporation, Hopkinton, MA (US)

( * ) Notice: Subject to any disclaimer, the term of this patent is extended or adjusted under 35 U.S.C. 154(b) by 363 days.

(21) Appl. No.: 13/339,693

(22) Filed: Dec. 29, 2011

(51) Int. Cl.
 *G06F 3/00* (2006.01)
 *G06F 15/173* (2006.01)
 *G06F 3/06* (2006.01)
 *H04L 12/56* (2006.01)

(52) U.S. Cl.
 CPC .............. *G06F 3/0635* (2013.01); *H04L 45/12* (2013.01); *H04L 45/24* (2013.01)
 USPC ............. 710/38; 710/120; 709/239; 709/238

(58) Field of Classification Search
 CPC ........ G06F 3/0635; H04L 45/12; H04L 45/24
 USPC ..................................... 710/38, 120; 709/239
 See application file for complete search history.

(56) References Cited

U.S. PATENT DOCUMENTS

| | | | |
|---|---|---|---|
| 6,766,359 B1 * | 7/2004 | Oliveira et al. | 709/213 |
| 6,889,309 B1 | 5/2005 | Oliveira et al. | |
| 7,451,341 B2 * | 11/2008 | Okaki et al. | 714/4.1 |
| 7,469,313 B1 | 12/2008 | Venkatanarayanan et al. | |
| 7,536,503 B1 | 5/2009 | Venkatanarayanan et al. | |
| 7,689,786 B1 | 3/2010 | Riordan et al. | |
| 7,702,829 B2 * | 4/2010 | Rickard et al. | 710/38 |
| 7,770,053 B1 | 8/2010 | Bappe et al. | |
| 7,809,912 B1 | 10/2010 | Raizen et al. | |
| 7,890,664 B1 | 2/2011 | Tao et al. | |
| 7,904,681 B1 | 3/2011 | Bappe et al. | |
| 7,937,481 B1 | 5/2011 | Sandstrom et al. | |
| 7,957,398 B1 | 6/2011 | Yochai et al. | |
| 7,962,567 B1 | 6/2011 | Sandstrom et al. | |
| 8,037,171 B2 * | 10/2011 | Burton et al. | 709/224 |
| 8,140,821 B1 | 3/2012 | Raizen et al. | |
| 8,156,306 B1 | 4/2012 | Raizen et al. | |
| 8,166,314 B1 | 4/2012 | Raizen et al. | |
| 8,190,784 B1 | 5/2012 | Raizen et al. | |
| 8,204,980 B1 | 6/2012 | Sandstrom et al. | |
| 8,261,068 B1 | 9/2012 | Raizen et al. | |
| 8,281,033 B1 | 10/2012 | Riordan et al. | |

(Continued)

*Primary Examiner* — Ernest Unelus
(74) *Attorney, Agent, or Firm* — BainwoodHuang (57) ABSTRACT

A host computer accesses a federated storage volume at first and second frames (physical storage assemblies). The host identifies a preferred frame by (1) obtaining representative values of a performance metric for sets of paths to the volume, each set associated with a different frame, and (2) selecting the frame associated with the path set having the best representative value. In one example a response latency is used to detect different distances to the host and identify the closer frame, which will be preferred. Operating modes of the paths for non-preferred frames are set to "standby". During subsequent operation using path selection to send storage operations to the volume, the host selects among paths in an "active" operating mode so as to access the volume at the preferred frame under normal operating condition. Standby paths are reserved for less normal operating conditions, such as when no active path is available.

23 Claims, 5 Drawing Sheets

(56) References Cited

U.S. PATENT DOCUMENTS

| | | |
|---|---|---|
| 8,316,161 B1 | 11/2012 | Contreras et al. |
| 8,332,612 B1 | 12/2012 | Raizen et al. |
| 8,332,613 B1 | 12/2012 | Glade et al. |
| 8,412,858 B2 | 4/2013 | Contreras et al. |
| 8,416,954 B1 | 4/2013 | Raizen et al. |
| 8,438,315 B1 | 5/2013 | Tao et al. |
| 8,452,900 B2 | 5/2013 | Povaliaev et al. |
| 8,468,241 B1 | 6/2013 | Raizen et al. |
| 8,601,085 B1 | 12/2013 | Ives et al. |
| 8,619,555 B2 * | 12/2013 | Dallas et al. .................. 370/228 |
| 8,705,538 B1 | 4/2014 | Yochai et al. |
| 2002/0166005 A1 * | 11/2002 | Errico ............................ 710/38 |
| 2006/0143332 A1 * | 6/2006 | Yagi et al. ....................... 710/38 |
| 2008/0162839 A1 * | 7/2008 | Nakamichi et al. ........... 711/159 |
| 2008/0228987 A1 * | 9/2008 | Yagi et al. ..................... 710/316 |

\* cited by examiner

IDENTIFICATION AND USE OF PREFERRED PATH GROUPS IN HOST COMPUTER BASED ON DIFFERENTIAL PERFORMANCE

BACKGROUND

The invention is directed to the field of data storage operations in data processing systems.

It is known to employ a technique referred to as "multipathing" in host computers performing storage operations to a storage system. When multiple distinct paths to a given storage volume are available to a host, the host selects from among the available paths for different storage commands being directed to the volume. Path selection is done to enhance performance by making full utilization of all paths and thereby achieving high utilization of storage resources and lower average latencies of storage operations. Thus paths may be selected based on an adaptive load balancing policy. Path selection may also be used to improve system availability. For example, in the event that a desired path becomes unavailable, path selection may automatically select an alternative path.

In some systems, multipathing functionality is provided by a driver that processes storage commands directed to an external storage system to which the host computer is connected. An example of such a multipathing driver is a driver sold under the name PowerPath® by EMC Corporation.

SUMMARY

Certain data processing systems may employ redundancy techniques for more reliable data storage as well as other system goals. One type of redundancy is found in the use of "federated volumes", which are storage volumes that are stored and accessible via multiple different physical locations. A host computer may be co-located with one physical storage component referred to as a "local frame", where a frame is a uniquely identified manufactured assembly providing access to associated physical storage. The host may be coupled to another frame located elsewhere, referred to as a "remote frame". Depending on the relative distance to the remote frame, storage operations performed by the host using the remote frame may experience considerably greater latency than storage operations performed by the host at the local frame. This situation can occur, for example, with an EMC Corporation VPLEX™ Metro configured to a host in a cross-connected fashion.

In the operation of a multipathing host computer used in conjunction with federated storage volumes as described above, there is the possibility of sub-optimal performance if the path selection algorithm does not account for performance differences among the paths, such as the proximity based differential latency between paths to a local frame versus paths to a remote frame. If paths of both types are treated the same for selection purposes, then overall performance may be lower than if the path selection algorithm favored paths to the local frame over paths to the remote frame. Lower performance can result from a higher average latency due to the regular use of the remote frame. There may also be other performance benefits to limiting accesses to a local frame that arise from the use of caching at the frames.

Methods and apparatus are disclosed for operating a host computer having access to a storage volume via two or more frames of a storage system, where each frame is a uniquely identified manufactured assembly providing access to associated physical storage. The method includes certain operations during an initialization or configuration phase that affect the paths that are used for storage I/O commands during subsequent operation. The initialization phase includes identifying one of the frames as a preferred frame by (1) obtaining representative values of a performance metric for respective sets of paths to the volume, where each set of paths is associated with a respective different one of the frames, and (2) selecting as the preferred frame the frame associated with the set of paths having the best representative value of the performance metric. In the case of round-trip latency as the performance metric, the representative value for a set of paths may be the smallest or minimum value among all the paths, and the best representative value may be the smallest or minimum value among the representative values of the sets. Thus for the set of paths that includes the path having the minimum latency, the corresponding frame is selected as the preferred frame. Other frame(s) are non-preferred frames. An operating mode of the paths associated with the non-preferred frames are set to a "standby" operating mode, in contrast to an "active" operating mode of the paths associated with the preferred frame (either by default or by explicit action if/when necessary).

During subsequent operation in which path selection is used to send storage read and write operations to the volume via different paths, the host computer selects from among paths in the active operating mode so as to access the volume at the preferred frame rather than at a non-preferred frame under normal operating conditions. The standby paths are reserved for use under less normal operating conditions, such as when no active path is available or is otherwise suitable for use. In the case that one frame is located physically closer to the host than are the other frame(s), the above operation causes the host to direct the storage I/O commands to the closer frame under normal circumstances, yielding higher performance than if the commands were sent on all the paths regardless of distance to the frame.

Thus the above method can provide a desired effect of using only higher-performance paths for normal storage operations to the storage volume, improving system performance over an alternative scheme that does not consider relative performance and that selects from among all available paths to the storage volume. Although the paths in the standby mode are not used for normal path selection, they may be available for use as backup in the event that no active paths to the storage volume are available, such as in the case of hardware failure(s) that render all active paths unusable, as well as in other cases.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
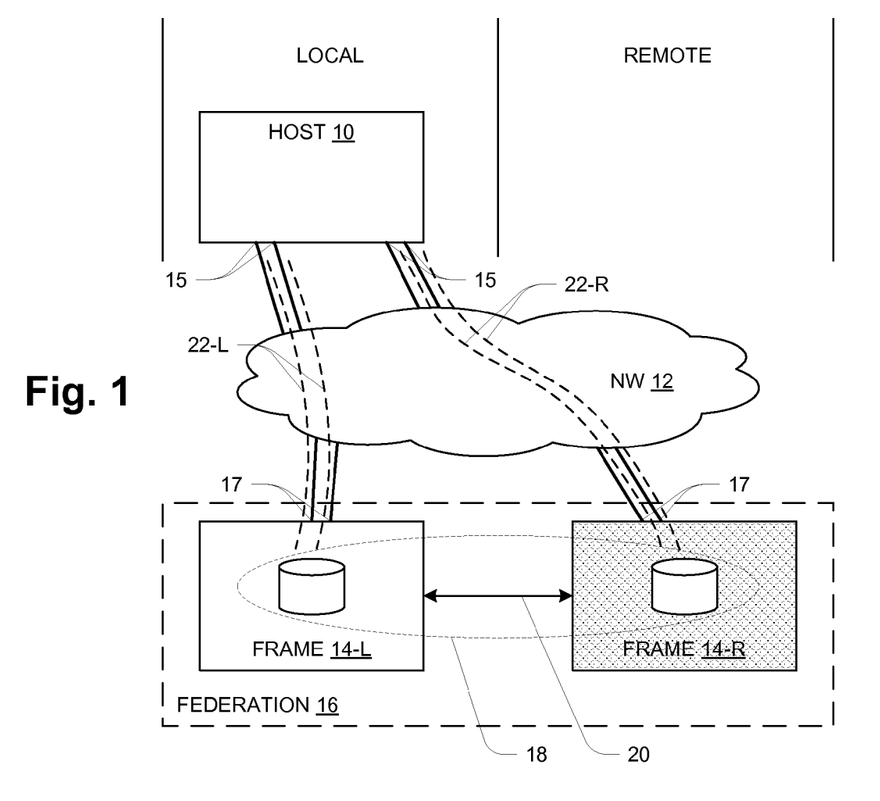
FIG. 1 is a block diagram of a data processing system.

FIG. 1 shows a data processing system having a host computer (HOST) 10, a storage interconnection network (NW) 12 and two "frames" 14 (shown as 14-L, 14-R and described below). In general, both the host 10 and frames 14 have multiple connections to the network 12 via respective ports 15, 17. And end-to-end connection between a host port 15 and frame port 17 may be referred to herein as a "bus" for carrying storage commands and data.

The system has components in multiple separate locations. In the arrangement of FIG. 1 there are two locations, referred to as "local" and "remote" with respect to the host 10. These may be separate buildings or campuses, for example. In the illustrated arrangement the host 10 resides locally along with a local frame 14-L; a remote frame 14-R resides remotely; and the network 12 spans the two locations. The system may include other hosts (not shown), including for example a host at the remote location also having connections to both frames 14-L and 14-R via network 12. Such a configuration may be referred to as a "cross connected" configuration.

The term "frame" refers to a uniquely identified manufactured assembly providing access to associated physical storage. Frames may be of several types, and they may include the associated physical storage or serve as a front end to the associated physical storage residing on a separate back end assembly. One type of frame, referred to as an "array", has a collection of disk drives along with control circuitry providing host interface(s) and other functions. An example of an array is a SAN- or NAS-based system sold under the name VNX™ by EMC Corporation. Other types of frames may be in the form of appliances serving as front ends to separate back-end physical storage. An example of this kind of frame is a storage controller appliance sold under the name VPLEX™ by EMC Corporation. Note that in VPLEX™ systems a frame may be referred to as a "cluster".

The frames 14 present to the host 10 one or more addressable units of storage referred to as "volumes". A set of two or more frames 14 may each provide access to the same volume, in which case the frames form a "federation" 16 and such volumes are referred to as "federated volumes". An example is shown as federated volume 18. The complete content of the federated volume 18 is accessible via either frame 14-L or 14-R. The frames 14 may use an inter-frame communication link 20 for certain coordinated activities. In the example of FIG. 1 are paths 22-L and 22-R associated with the federated volume 18, where the paths 22-L extend to the volume 18 as presented by the local frame 14-L, and the paths 22-R extend to the volume 18 as presented by the remote frame 14-R. Note that the remote frame 14-R is shaded to indicate a status as a "non-preferred" frame, described below.

Figure 2:
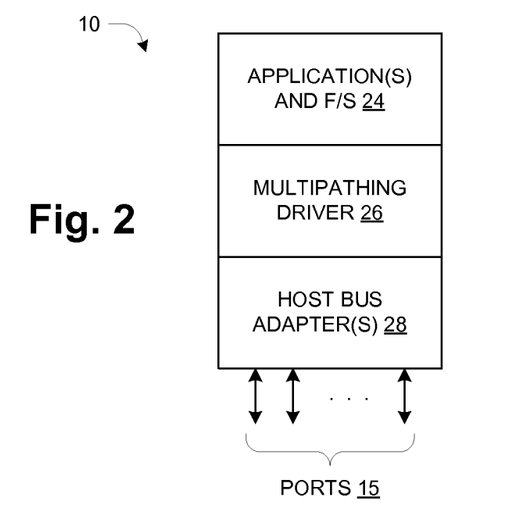
FIG. 2 is a block diagram of a host computer.

FIG. 2 shows pertinent structure and organization of the host 10. It will be appreciated that from a hardware perspective the host 10 is a computer including one or more processors, memory, and input/output circuitry along with internal data bus(es) interconnecting these components (not shown in FIG. 2). This circuitry executes computer instructions that form various programs, routines, etc., including an operating system and one or more application programs for example. FIG. 2 illustrates executing application program(s) and file system(s) (F/S) 24 as well as an executing multipathing driver 26 used in the processing of storage I/O operations, along with a host bus adapter(s) or HBA(s) 28 which include(s) hardware circuitry that interfaces the host 10 to the network 12 via port(s) 15. The host 10 may have one or more HBAs 28, and each HBA 28 may have one or more ports 15.

The multipathing driver 26 typically forms part of an operating system of the host 10. It may be part of a set of drivers that together process the storage I/O commands from the applications and file system 24 directed to the frames 14. As an example, it may be used with a SCSI class driver and an HBA driver. In such an arrangement the multipathing driver 26 may be realized as a so-called "filter" driver that performs special processing for storage I/O commands. The term "multipathing" refers to functionality of identifying, using and managing the various paths to storage volumes (e.g., paths 22 to volume 18) to effect system goals while hiding details of these operations from the application(s) and file system 24, as described in more detail below. System goals can include performance goals (from the use of parallel operations over multiple paths 22), availability goals (from the use of redundancy and fail-over techniques), etc.

Figure 3:
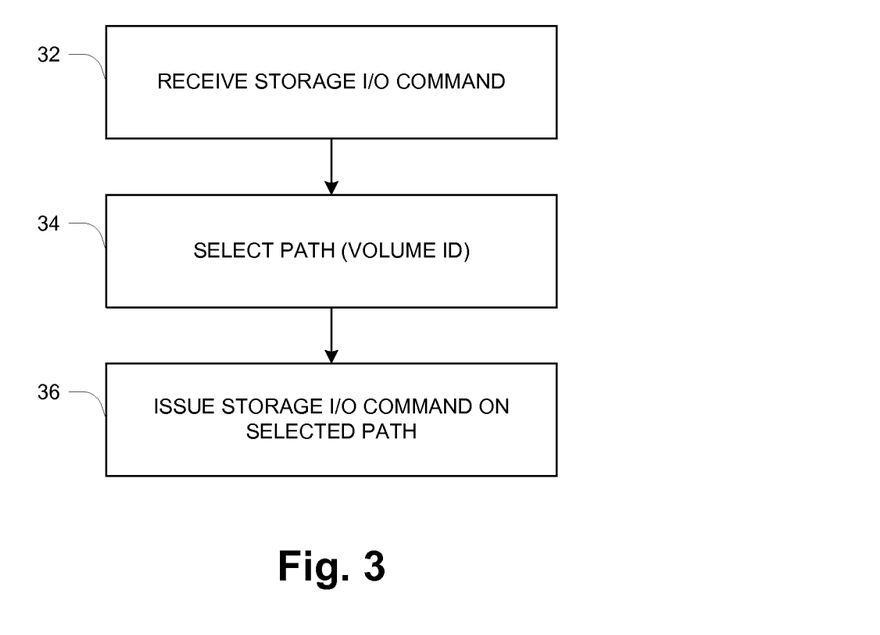
FIG. 3 is a flow diagram for processing of a storage I/O command.

FIG. 3 illustrates basic operation of the multipathing driver 26 when processing a storage I/O command. At 32, it receives the storage I/O command (such as a read data or write data command) for a storage operation being performed by the application(s) or F/S 24. The storage I/O command will typically be included in an I/O command block passed from a higher-level component of the operating system to the multipathing driver 26, as generally known in the art. The storage I/O command will include, among other things, an identification of the volume to which the storage operation is directed, such as volume 18.

At 34, the multipathing driver 26 selects a path that is to be used for the storage I/O command, based on the identification (VOLUME ID) of the volume. In the case of volume 18, selection may be from among the paths 22 as shown in FIG. 1, subject to consideration of path operating modes as explained below. Path selection provides load balancing across the set of paths to a volume, and continued availability of the volume in the event of failure of a path.

At 36, the multipathing driver 26 issues the storage I/O command on the selected path. Again referring to an example I/O command directed to volume 18, the command will be sent to one of the frames 14 via a selected one of the paths 22. The selected path will also be used for the data transfer associated with the I/O command, as well as the eventual response indicating completion of the I/O command, as generally known in the art.

Figure 4:
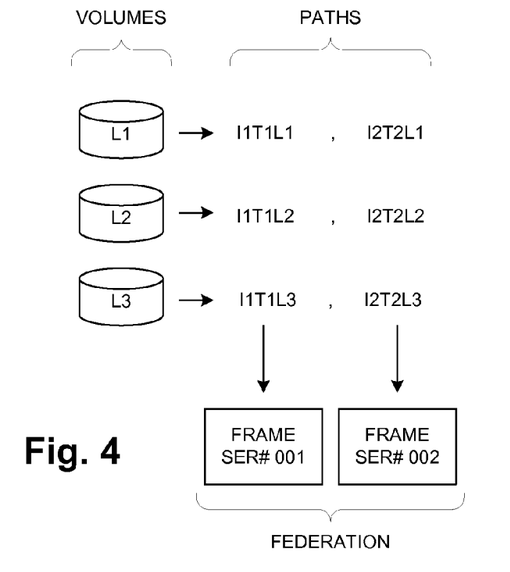
FIGS. 4 and 5 are schematic diagrams depicting relationships of paths, volumes, frames and federations.

FIGS. 4 and 5 are used to describe certain details of paths and their relation to volumes, frames and federations. The example of FIG. 4 is generalized beyond the specific arrangement of FIG. 1. At the left in FIG. 4 are shown three federated volumes labeled L1, L2 and L3. The letter "L" in this context refers to "LUN", a term commonly used to describe a logical unit of storage as presented by a frame. In the present description "volume" and "LUN" are synonymous. In this example, each volume is associated with two paths, and each path is identified by a text string having the general structure IxTyLz. This format is a reference to a so-called "Initiator-Target-LUN" or I-T-L nexus, which is one specific example of how a path may be identified in a storage system. In the present context, an Initiator is port of a host, a Target is port of a frame, and a LUN is a volume. In FIG. 4, the path identifiers for volume L1, for example, are shown as I1T1L1 and I2T2L1. These paths both extend to LUN 1, via separate Initiator-Target pairs (I1, T1) and (I2, T2). The path pairs for volumes L2 and L3 are analogous. Thus the three paths on the left are associated with one frame, and the three on the right with another frame. These two frames are included in a federation.

In the above simplified example there is only one path to each volume at a given frame. In general there can be (and in many cases will be) multiple paths to a volume at a given frame. Many systems are configured to have multiple I-T buses extending between a host 10 and a frame 14, for example, and in such cases there may be multiple paths to a given volume 18 for each separate I-T bus.

Figure 5:
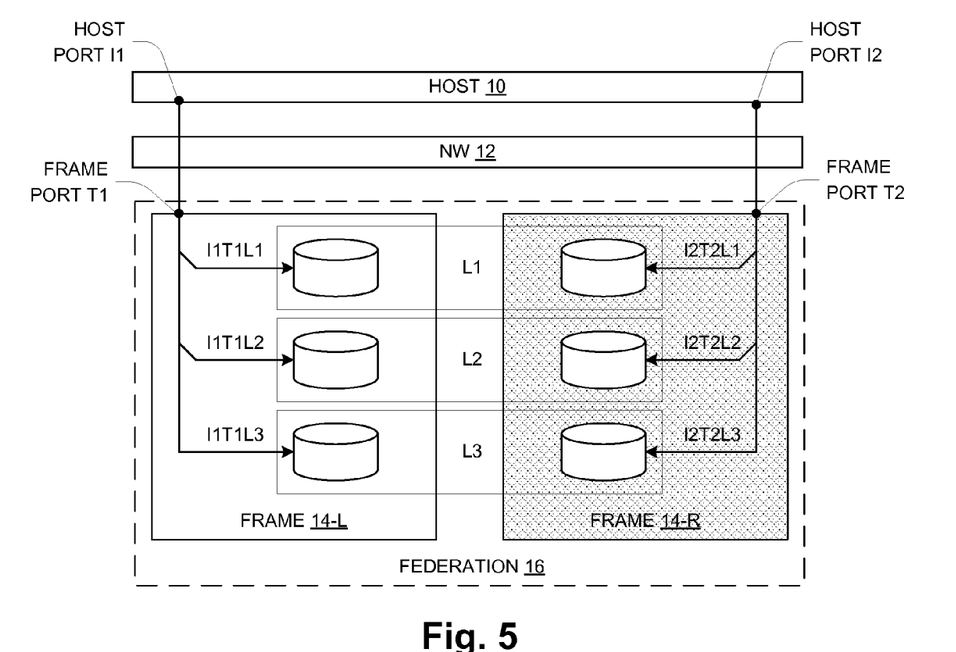

FIG. 5 shows the example of FIG. 4 cast into the form of FIG. 1, where it is assumed that all three volumes L1, L2 and L3 are part of the federation 16. In this example, the frame SER#001 of FIG. 4 is the local frame 14-L, while the frame SER#002 is the remote frame 14-R. The non-preferred frame 14-R is indicated by shading. In this depiction, the values I1 and I2 identify different ports of the host 10 (ref. 15 in FIG. 1); the values T1 and T2 identify respective ports of the frames 14-L and 14-R (ref. 17 in FIG. 1); and the values L1-L3 identify the LUNs L1-L3 (ref 18 in FIG. 1). Each path IxTyLz corresponds to a path 22 in FIG. 1.

In operation, the multipath driver 26 performs a "discovery" process by which it builds up a representation of the system configuration, then uses this information in subsequent operation. FIGS. 4 and 5 show essential aspects of the representation schematically, and discovery is briefly described with respect thereto. In implementation, the driver 26 will typically employ an arrangement of data structures to capture and organize configuration information, as described in an example below.

The paths are assumed to be known to the host 10, for example by a previous LUN scanning or other operation that identifies I-T-L values to the host 10. Such techniques are generally known in the art. The driver 26 performs path-specific inquiries to obtain additional information. These may use an "Inquiry" command defined in the Small Computer System Interface (SCSI) standard, for example. As mentioned above, a frame is a manufactured assembly such as an array. In a commercial embodiment, a frame will have product information such as a product name, a serial number identifying a specific one of a series of manufactured assemblies, a manufacturer name, etc. The product information for the frame through which the path extends is returned in response to each inquiry during discovery. By this mechanism the host 10 becomes aware of different frames in association with the volumes. In the simple example of FIGS. 4 and 5, the host 10 sends separate inquiries on all six paths. Along with other information, the responses for the left three paths will include product data for frame 14-L (including its serial number SER#001), while the responses for the right three paths will include product data for frame 14-R (including its serial number SER#002). Based on these responses, the host 10 learns that the volumes L1-L3 are each accessible via the two different frames 14-L and 14-R.

Thus during discovery each path becomes associated with the one frame through which it extends, and each path becomes associated with a specific unique volume. Each frame is included in a federation. When a specific unique volume has paths going through more than one frame, then those frames are included in the same federation. The inquiries may be used to obtain values of a "performance metric", such as latency of each inquiry operation on a per-path basis, which is used in a subsequent operation as described below. In this case, the discovery process keeps track of the lowest per-path inquiry time observed on a per-frame basis (or in other cases a per-volume basis, see below). While discovery provides information for path selection generally, the performance metric values have a more specific use as described below. In some embodiments the measurements may not be taken if the feature described below is not enabled by a system administrator. Beyond performing this function during discovery, it may also be done when the feature becomes enabled during operation, or when a user command requests recalculation of the preferred frame. Once discovery is completed, then a separate process of determining a "preferred" frame and setting operating modes of paths is performed, as described below. If this feature is not enabled during discovery at startup, then the process is slightly different.

Figure 6:
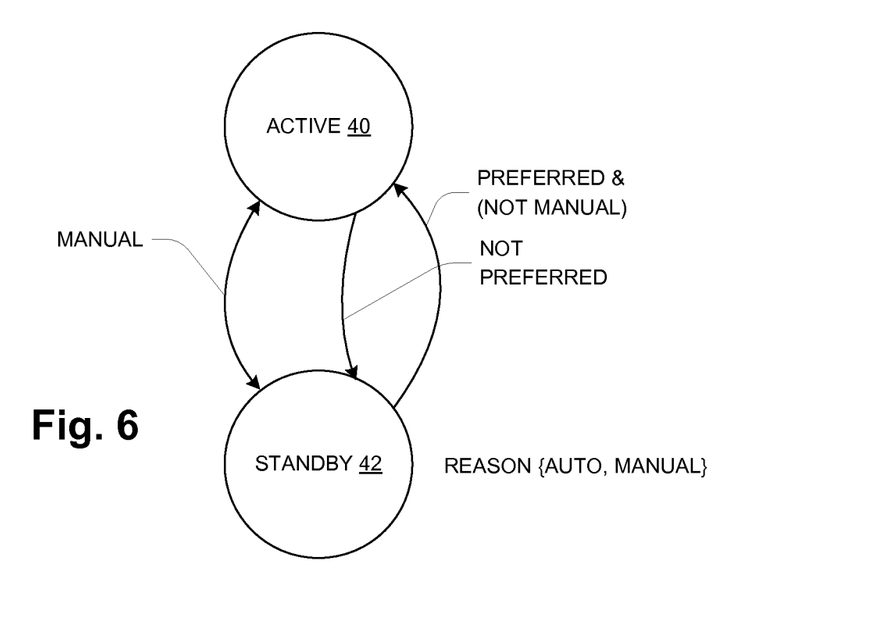
FIG. 6 is a state diagram for an operating mode of a path.

FIG. 6 illustrates a set of operating states or modes that can apply to an individual path 22, along with an indication of conditions for transitions between the modes. Each path 22 is in either an active mode 40 or a standby mode 42. Paths in the active mode 40 are more generally used during path selection than paths in the standby mode 42. Paths in the standby mode 42 are selected for use only under more restrictive circumstances. For example, a path in the standby mode 42 may be selected for use if there are no paths to the same volume that are in the active mode 40. This could occur, for example, if each active-mode path experienced a failure. As explained below, the standby mode 42 is used to identify paths that are to be treated differently from active-mode paths during path selection because of performance differences (arising from differences in physical proximity between the host and the frames associated with the paths for example).

Associated with the standby mode 42 may be an indicator for a "reason" or mechanism by which the standby mode 42 was entered. As an example, the standby mode 42 may be entered manually or automatically, where "manual" refers to action of an administrator for example and "automatic" refers to programmed action of the multipathing driver 26. There may be additional or other descriptions of reasons. For example, if the multipathing driver 26 can set a path to the standby mode 42 for multiple different reasons, then this information may be reflected in the "reason" indicator. With respect to the presently disclosed technique, an enhanced reason might be "automatic based on differential performance". The reason may affect the transitions between the modes 40 and 42. As shown at left, either active mode 40 or standby mode 42 may be entered manually. This mechanism enables an administrative user to independently affect operational behavior. For example, if an administrative user becomes aware of a reason that a path should preferably not be used, it may manually place the path into the standby mode 42. When this has occurred, the path can only be placed back into the active mode 40 by another manual operation—the multipathing driver 26 does not override this manual setting.

Automatic transitions are shown as occurring under conditions identified as "Preferred & (Not Manual)" and "Not Preferred". These refer to whether the path has been determined to be associated with a preferred frame 14 (described below). A path may be placed into the standby mode 42 automatically by the driver 26 if the path is associated with a non-preferred frame. A path can be placed into the active mode 40 automatically by the driver 26 if the path is associated with a preferred frame, as long as the path is not in the standby mode 42 by manual action.

The operating modes of the paths 22 may or may not persist across a re-booting of the host 10 or re-starting of the multipathing driver 26. In many cases it will be desirable for manual settings to persist. It may be desirable for automatic settings to be recalculated. If a path has been set to the standby mode 42 by the driver 26, then upon a re-start the path may initially be in the active mode 40 by default. The driver 26 will typically go through a process described below to re-select a preferred frame 14 and set the operating modes of paths accordingly. Note that the system may include an administrator-controlled "enable" that controls whether or not the process described below is used during operation. It is preferable that the value for this enable control persist across re-starts.

Figure 7:
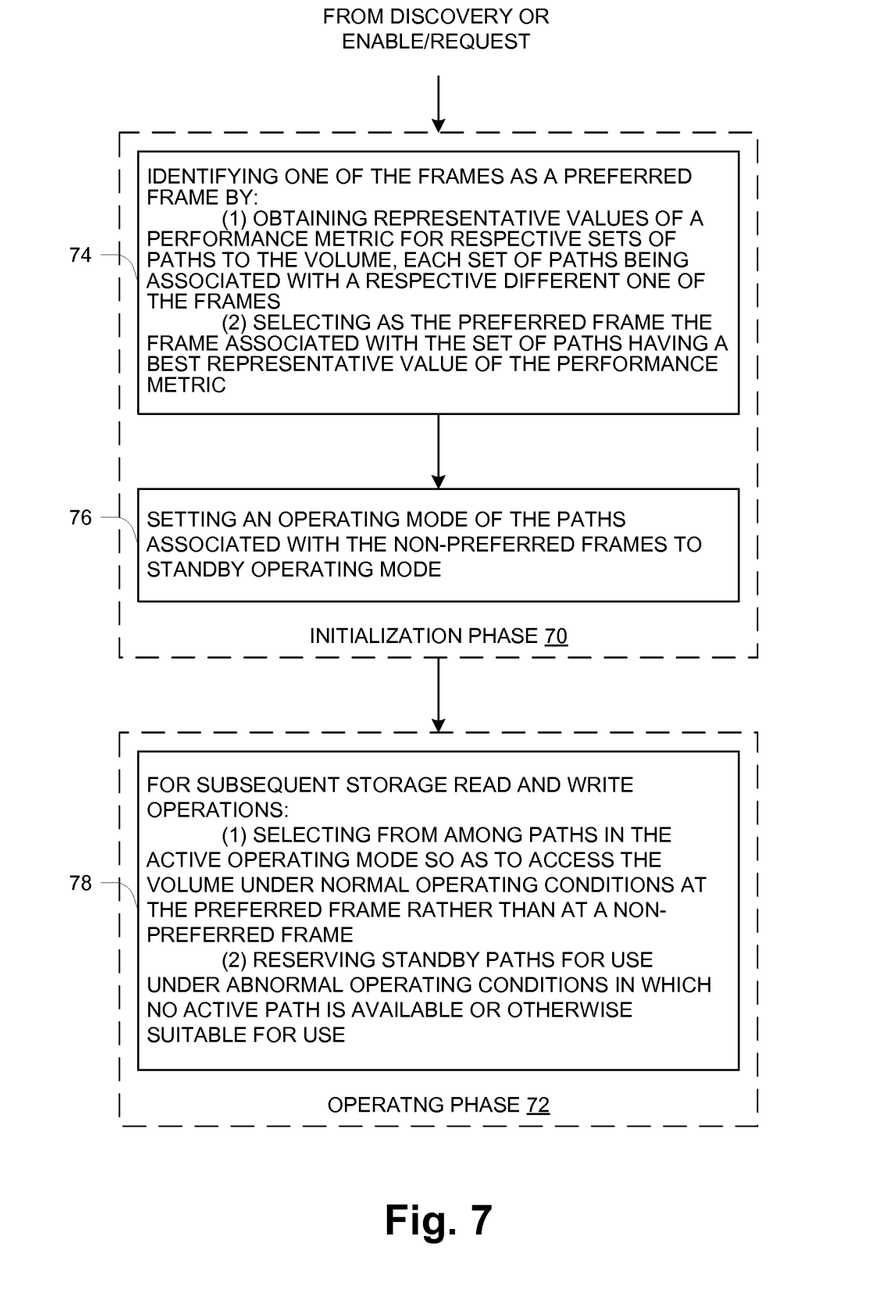
FIG. 7 is a flow diagram for operations of a host computer of the data processing system.

FIG. 7 shows a process of automatically setting and subsequently utilizing the operating modes of the paths 22. It can be entered after discovery, upon the feature being enabled, or upon user request as mentioned above. Operation has two phases, an initialization or configuration phase 70 followed by an operating phase 72 of processing storage I/O commands. The process is described using the specific references of FIG. 1, but it will be appreciated that it applies to other configurations including those in which a volume is accessed via more than two frames.

During the initialization phase 70, at 74 one of the frames 14 is identified as a preferred frame by performing the following:

(1) Obtaining representative values of a performance metric for respective sets of paths 22 to the volume(s) 18 presented by the frames 14, wherein each set of paths 22 is associated with a respective different one of the frames 14. Examples of useful performance metrics and the calculation of representative values are explained below. In this operation, a set of paths 22 corresponds to a column of paths in the arrangement of FIG. 4, i.e., each set is the set of all paths 22 through one specific frame 14.

(2) Selecting as the preferred frame the frame 14 associated with the set of paths 22 having the best representative value of the performance metric. The frame(s) 14 not selected in this operation are referred to as "non-preferred" frames. Here "best" refers to the representative value associated with highest performance. In the case that latency is used as a performance metric (generally an inverse relationship), the best representative latency may be the lowest or minimum value.

Further during initialization 70, at 76 the operating mode of the paths 22 associated with the non-preferred frame(s) are set to the standby operating mode 42. In one embodiment, it may be assumed that the paths to the preferred frame 14 are already in the active operating mode 40, so it is unnecessary to explicitly set their operating modes. In other embodiments, it may be necessary to explicitly set the path operating modes (for some or all paths) to the active operating mode 40.

During the operating phase 72. at 78 path selection is used to send storage read and write operations to the volumes 18 via different paths. Path selection is limited to those paths in the active operating mode 40, so that under normal operating conditions the volumes are accessed at the preferred frame 14L rather than at a non-preferred frame 14R. The standby paths are reserved for use under less normal operating conditions in which no active path is available or otherwise suitable for use. Given that the preferred frame is associated with the best representative value of the performance metric, this operation yields correspondingly better system performance than possible alternatives, such as a path selection technique that treats all paths equally, for example. It is noted here that other factors that affect path selection, such as asymmetric logical unit access or ALUA, operate within the confines of the set of active paths.

As previously mentioned, in one embodiment the performance metric used for the process of FIG. 7 is response time or latency between the issuance of a storage command down a specific path 22 by the multipathing driver 26 and the later receiving of a corresponding response by the multipathing driver 26. In one embodiment, the multipathing driver 26 itself performs a set of latency measurements, during discovery or otherwise as mentioned above. The multipathing driver 26 may issue a separate inquiry on each path to the target volume, keeping track of the time of issuance of the command as well as the time of receiving a corresponding response. The path latency is calculated as the difference between the two time values.

Representative latency values for respective sets of paths can be defined and compared in a variety of ways. For example, the multipathing driver 26 may treat the minimum latency value found for a set of paths as the representative value, and compare the minimum latency value found for one set of paths to the minimum latency value found for another set of paths. Other types of representative values may be used, such as greatest values, average values, or some other values that are derived from and representative of the respective sets of values of the sets of paths.

In one embodiment, the term "set of paths" refers to those paths extending to volumes via a given frame 14, such as described above with reference to FIG. 4. That is, in the example of FIG. 4, the paths I1T1L1, I1T1L2 and I1T1L3 form one set of paths, and the paths I2T2L1, I2T2L2 and I2T2L3 form another set of paths. In this case, the minimum latency among each set of paths is taken as the representative value for that set, then the two (in this case) minimum latency values are compared to identify the lower-latency value.

There may be cases in which it is desirable to identify a preferred frame with greater granularity, for example on a per-volume basis. That is, for each federated volume 18 the host 10 may identify a corresponding specific preferred frame 14. Referring again to the example of FIG. 4, different preferred frames 14 may be identified for each separate volume L1, L2 and L3. In this case, the term "set of paths" has a slightly different meaning—it refers to the set of paths that extend to a given volume at a given frame.

In the above description, path latency measurements are obtained using the SCSI Inquiry or similar command. In alternative embodiments, the multipathing driver 26 may perform path measurements in some different manner or at different times than those described above. As a further alternative, the multipathing driver 26 may rely on measurement values provided by some other system component or by an administrative user, for example. Also, as mentioned, performance metrics other than latency may be used in alternative embodiments.

Figure 8:
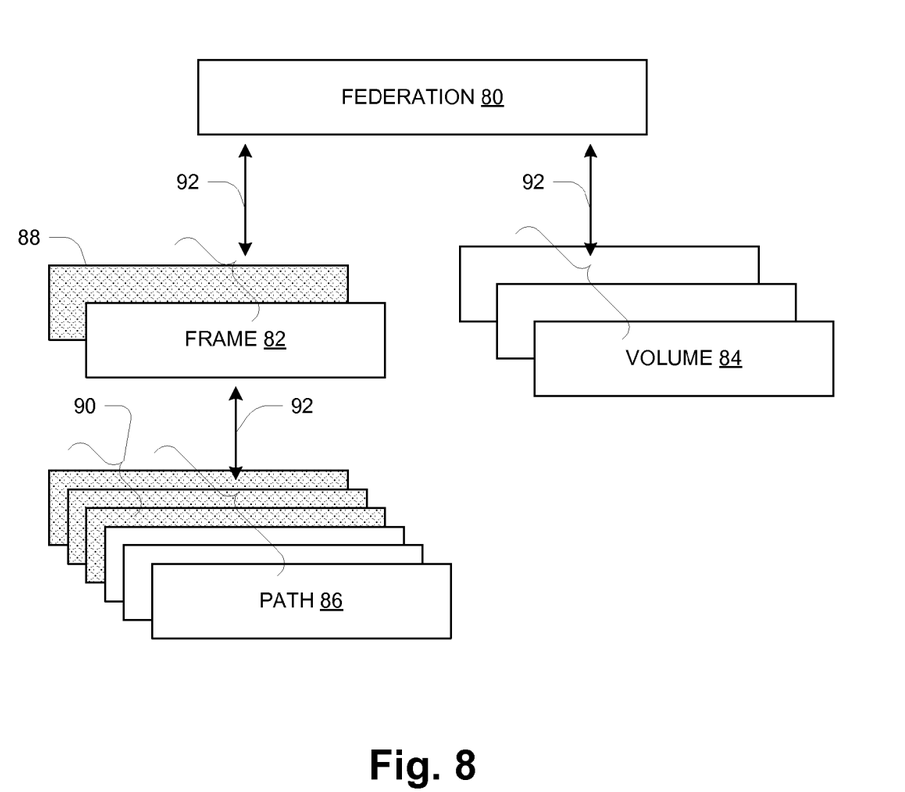
FIG. 8 is a schematic diagram of an arrangement of data structures.

FIG. 8 describes certain data structures and their interrelatedness to support the above described operation of the multipath driver 26. Data structure types include a federation structure 80, a frame structure 82, a volume structure 84, and a path structure 86, each used to store data for a corresponding component (federation 16, frame 14, volume 18 and path 22 respectively). The specific arrangement of FIG. 8 reflects the example of FIGS. 4 and 5—one federation of two frames, three volumes and six paths. The structures 88, 90 for the non-preferred frame 14-R and corresponding paths 22 are indicated by shading. A real system will typically have a more complex arrangement, with different federation structures 80 being used for different sets of frame structures 82 and volume structures 84 as necessary.

The structures are connected or linked as indicated by arrows 92. The volume structures 84 and frame structures 82 are each linked to the federation structure 80. The path structures 86 are linked to respective ones of the frame structures 82, i.e., each path structure 86 is linked to the frame structure 82 for the frame 14 through which the corresponding path 22 extends. In implementation, it may be useful to employ intermediate "list" structures for paths and/or volumes, with each list structure being linked in one direction to a frame structure 82 or federation structure 80 and in the other direction to the associated path structures 86. Using this arrangement, just the list can be manipulated for changes, rather than requiring manipulation of several data structure.

The structures shown in FIG. 8 can be used to hold data associated with a respective instance of an item in the system. As one example, a federation structure 80 may store a link to the frame structure 82 of the preferred frame 14 for the federation.16. The measured values of the performance metric can be stored in the path structures 86, and an indication of the representative value for a set of paths 22 may be stored in the corresponding frame structure 82. There may also be direct linking between the volume structure 84 for a volume 18 and the path structures 86 for the paths 22 to that volume 18. For example, each volume structure 84 may have a link to a separate path list structure (not shown) that includes links to the path structures 86. Other direct linking mechanisms may also be employed. In a system that identifies preferred frames on a per-volume basis as described above, the identification of preferred frames and the stored representative values may be located in a volume structure 84 rather than in the frame structure 82.

An arrangement of structures like that of FIG. 8 can be built up during the above-mentioned discovery process. It may be, for example, that the paths 22 are a priori known, in which case the multipathing driver 26 may begin by creating corresponding path structures 86. In this process it may use the SCSI Inquiry command or other mechanism to obtain a measured value of the performance metric, e.g. latency, and populate the structure of each path 22 with the measured value. Each time the driver 26 discovers a new frame 14, it creates a corresponding frame structure 82. When the driver 26 discovers that a frame 14 is an additional frame 14 through which a volume 18 can be accessed, it creates (or modifies if existing) a corresponding federation structure 80, associating the new frame 14 as well as the volume 18 with the federation.

While the above description focuses primarily on differential proximity and resulting performance (latency) differences as a basis for selecting a preferred frame 14, in alternative embodiments this selection could be made based on some other basis, which would typically be performance-based in a broad sense of "performance". In fact, different frames might be in the same proximity, but they could have different characteristics that make one preferable over the other(s). Alternatively, it may be best to use one frame consistently over other(s), even if they generally operate identically. This might be the case, for example, when the frames utilize caching. Using one frame consistently might make better use of caching, avoiding issues of thrashing, low hit rate, etc.

While the above description utilizes the setting of different path operating modes (active, standby) to reflect the association of paths with a preferred or non-preferred frame, in alternative embodiments it may be possible to use other mechanisms. Generally it is desired to apply some type of differential marking to the paths, to distinguish paths extending through a preferred frame from paths extending through a non-preferred frame. Referring to the process as described with reference to FIG. 7, step 76 corresponds to the differential marking, and step 78 corresponds to the use of the differential marking in subsequent path selection.

While various embodiments of the invention have been particularly shown and described, it will be understood by those skilled in the art that various changes in form and details may be made therein without departing from the scope of the invention as defined by the appended claims.

What is claimed is:

1. A method of operating a host computer having access to a storage volume via two or more frames of a storage system, each frame being a uniquely identified manufactured assembly providing access to associated physical storage, comprising:

identifying one of the frames as a preferred frame by:
(1) obtaining representative values of a performance metric for respective sets of paths to the volume, each set of paths being associated with a respective different one of the frames; and
(2) selecting as the preferred frame the frame associated with the set of paths having a best representative value of the performance metric, each frame that is not selected being a non-preferred frame;

for subsequent storage read and write operations in which path selection is used to send storage read and write operations to the volume via different paths, selecting from among paths associated with the preferred frame so as to access the volume under normal operating conditions at the preferred frame rather than at a non-preferred frame, the paths associated with the non-preferred frame being reserved for use under less normal operating conditions in which no active path is available or otherwise suitable for use;

wherein the two or more frames of the storage system include a first data storage array and a second data storage array;

wherein multiple first paths connect the host computer to the first data storage array;

wherein multiple second paths connect the host computer to the second data storage array;

wherein the performance metric is a latency measure;

wherein selecting, as the preferred frame, the frame associated with the set of paths having the best representative value of the performance metric includes:
choosing the first data storage array as the preferred frame over the second data storage array due to the first paths providing lower latency than the second paths, the second data storage array being a non-preferred frame;

wherein selecting from among the paths associated with the preferred frame includes:
after selecting the frame associated with the set of paths having the best representative value of the performance metric as the preferred frame, (i) selecting a single first path of the multiple first paths connecting the host computer to the first data storage array in response to an input/output command, and (ii) accessing the volume through the selected single first path to process the input/output command; and wherein an inter-frame communication link connects the first data storage array and the second data storage array together; and wherein the method further comprises:
providing access to any content of the volume through only one of the first paths due to inter-frame access via the inter-frame communication link.

2. A method according to claim 1, wherein the latency measure is latency between issuance of a storage command on a path and subsequent receiving of a corresponding response to the storage command.

3. A method according to claim 2, wherein the storage command used for measuring the latency is a Small Computer System Interface (SCSI) Inquiry command.

4. A method according to claim 3, wherein the SCSI Inquiry command used to measure the latency is a SCSI Inquiry command used during a discovery process preceding the identifying step, the discovery process used to establish mutual associations among the paths, frames, volume and federation.

5. A method according to claim 1, wherein the representative values of the performance metric are correlated with proximity of the host computer to the respective frames, and the preferred frame is a local frame geographically closer to the host computer than is the non-preferred frame.

6. A method according to claim 1, wherein the paths associated with the non-preferred frame include paths having a standby mode which are available for use as backup paths to the volume in the event that no active-mode paths to the volume are available for use.

7. A method according to claim 1, wherein the host computer employs an arrangement of data structures to store information about associations among the paths, frames, volume and federation, the arrangement of data structures including a federation data structure, a volume data structure associated with the volume, frame data structures each associated with a respective one of the frames, and path data structures each associated with a respective one of the paths, the volume and frame data structures being linked to the federation data structure, the path data structures of the paths of each set of paths being linked to the frame data structure of the frame associated with the set of paths.

8. A method according to claim 1, wherein the frames are located in respective different locations having respective different distances from the host computer, and wherein the latency measure is a distance-related performance metric.

9. A method according to claim 8, wherein the distance-related performance metric is response latency between a first time at which the host issues a command on a path and a second time at which the host receives a corresponding response.

10. A method according to claim 8, wherein the different locations include a local location and one or more remote locations, the local location including the host computer and a local one of the frames, each remote location including a respective remote one of the frames and a respective remote host computer, and wherein the local and remote locations and connected in a cross-connected configuration providing each of the host computers with access to volumes at each of the frames.

11. A method according to claim 1, further including setting an operating mode of the paths associated with each non-preferred frame to a standby operating mode, and wherein selecting the single first path includes selecting from among paths in an active operating mode and reserving the paths in the standby operating mode for use under the less normal operating conditions.

12. A computer operable as a host computer having access a storage volume via two or more frames of a storage system, each frame being a uniquely identified manufactured assembly providing access to associated physical storage, comprising:
processing circuitry;
memory;
input/output circuitry; and
one or more data busses interconnecting the processing circuitry, memory and input/output circuitry,
wherein the memory is operative to store computer program instructions which, when executed by the processing circuitry, cause the computer to perform a method including:
identifying one of the frames as a preferred frame by:
(1) obtaining representative values of a performance metric for respective sets of paths to the volume, each set of paths being associated with a respective different one of the frames; and
(2) selecting as the preferred frame the frame associated with the set of paths having a best representative value of the performance metric, each frame that is not selected being a non-preferred frame;
setting an operating mode of the paths associated with each non-preferred frame to a standby operating mode, and
for subsequent storage read and write operations in which path selection is used to send storage read and write operations to the volume via different paths, selecting from among paths in the active operating mode so as to access the volume under normal operating conditions at the preferred frame rather than at a non-preferred frame, the standby paths being reserved for use under less normal operating conditions in which no active path is available or otherwise suitable for use;
wherein the two or more frames of the storage system include a first data storage array and a second data storage array;
wherein multiple first paths connect the host computer to the first data storage array;
wherein multiple second paths connect the host computer to the second data storage array;
wherein the performance metric is a latency measure;
wherein selecting as the preferred frame the frame associated with the set of paths having the best representative value of the performance metric includes:
choosing the first data storage array as the preferred frame over the second data storage array due to the first paths providing lower latency than the second paths, the second data storage array being a non-preferred frame;
wherein selecting from among the paths in the active operating mode includes:
after choosing the first data storage array, (i) selecting a single path of the first paths connecting the host computer to the first data storage array in response to an input/output command, and (ii) accessing the volume through the selected single path to process the input/output command;
wherein an inter-frame communication link connects the first data storage array and the second data storage array together; and
wherein the method further comprises:
providing access to any content of the volume through only one of the first paths due to inter-frame access via the inter-frame communication link.

13. A host computer according to claim 12, wherein the latency measure is latency between issuance of a storage command on a path and subsequent receiving of a corresponding response to the storage command.

14. A host computer according to claim 13, wherein the storage command used for measuring the latency is a Small Computer System Interface (SCSI) Inquiry command.

15. A host computer according to claim 14, wherein the SCSI Inquiry command used to measure the latency is a SCSI Inquiry command used during a discovery process preceding the identifying step, the discovery process used to establish mutual associations among the paths, frames, volume and federation.

16. A host computer according to claim 12, wherein the representative values of the performance metric are correlated with proximity of the host computer to the respective frames, and the preferred frame is a local frame geographically closer to the host computer than is the non-preferred frame.

17. A host computer according to claim 12, wherein the paths having the standby operating mode are available for use as backup paths to the volume in the event that no active-mode paths to the volume are available for use.

18. A host computer according to claim 12, wherein the method further causes the host computer to employ an arrangement of data structures to store information about associations among the paths, frames, volume and federation, the arrangement of data structures including a federation data structure, a volume data structure associated with the volume, frame data structures each associated with a respective one of the frames, and path data structures each associated with a respective one of the paths, the volume and frame data structures being linked to the federation data structure, the path data structures of the paths of each set of paths being linked to the frame data structure of the frame associated with the set of paths.

19. A host computer according to claim 12, wherein the frames are located in respective different locations having respective different distances from the host computer, and wherein the latency measure is a distance-related performance metric.

20. A host computer according to claim 19, wherein the distance-related performance metric is response latency between a first time at which the host issues a command on a path and a second time at which the host receives a corresponding response.

21. A host computer according to claim 19, wherein the different locations include a local location and one or more remote locations, the local location including the host computer and a local one of the frames, each remote location including a respective remote one of the frames and a respective remote host computer, and wherein the local and remote locations and connected in a cross-connected configuration providing each of the host computers with access to volumes at each of the frames.

22. A host computer according to claim 12, wherein the method performed by the host computer further includes setting an operating mode of the paths associated with each non-preferred frame to a standby operating mode, and wherein selecting the single path includes selecting from among paths in an active operating mode and reserving the paths in the standby operating mode for use under the less normal operating conditions.

23. A non-transitory computer readable storage medium storing computer program instructions which, when executed by a host computer having access to a storage volume via two or more data storage devices of a storage system, each data storage device being a uniquely identified manufactured assembly providing access to associated physical storage, cause the host computer to perform a method comprising:
identifying one of the data storage devices as a preferred data storage device by:
(1) obtaining representative values of a performance metric for respective sets of paths to the volume, each set of paths being associated with a respective different one of the data storage devices; and
(2) selecting, as the preferred data storage device, the data storage device associated with the set of paths having a best representative value of the performance metric, each data storage device that is not selected being a non-preferred data storage device;
for subsequent storage read and write operations in which path selection is used to send storage read and write operations to the volume via different paths, selecting from among paths associated with the preferred data storage device so as to access the volume under normal operating conditions at the preferred frame rather than at a non-preferred data storage device, the paths associated with the non-preferred data storage device being reserved for use under less normal operating conditions in which no active path is available or otherwise suitable for use;
wherein the two or more data storage devices of the storage system include a first data storage device and a second data storage device;
wherein multiple first paths connect the host computer to the first data storage device;
wherein multiple second paths connect the host computer to the second data storage device;
wherein the performance metric is a latency measure;
wherein selecting, as the preferred data storage device, the data storage device associated with the set of paths having the best representative value of the performance metric includes:
choosing the first data storage device as the preferred data storage device over the second data storage device due to the first paths providing lower latency than the second paths, the second data storage device being a non-preferred frame;
wherein selecting from among the paths associated with the preferred frame includes:
after selecting the data storage device associated with the set of paths having the best representative value of the performance metric as the preferred frame, (i) selecting a single first path of the multiple first paths connecting the host computer to the first data storage device in response to an input/output command, and (ii) accessing the volume through the selected single first path to process the input/output command
wherein an inter-frame communication link connects the first data storage array and the second data storage array together; and
wherein the method further comprises:
providing access to any content of the volume through only one of the first paths due to inter-frame access via the inter-frame communication link.

* * * * *